(12) United States Patent
Burrahm et al.

(10) Patent No.: US 7,748,976 B2
(45) Date of Patent: Jul. 6, 2010

(54) USE OF RECIRCULATED EXHAUST GAS IN A BURNER-BASED EXHAUST GENERATION SYSTEM FOR REDUCED FUEL CONSUMPTION AND FOR COOLING

(75) Inventors: Robert Wayne Burrahm, San Antonio, TX (US); Michael Glenn Ross, San Antonio, TX (US); Cynthia Chaffin Webb, San Antonio, TX (US); Suzanne Annette Timmons, San Antonio, TX (US); Gordon James Johnston Bartley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 124 days.

(21) Appl. No.: 11/376,961

(22) Filed: Mar. 16, 2006

(65) Prior Publication Data

US 2006/0234174 A1    Oct. 19, 2006

Related U.S. Application Data

(60) Provisional application No. 60/662,581, filed on Mar. 17, 2005.

(51) Int. Cl.
*F23C 9/08* (2006.01)
(52) U.S. Cl. .................. 431/2; 431/115; 73/114.75; 73/114.74
(58) Field of Classification Search ............. 431/9, 431/20, 115, 116, 2; 73/114.74, 114.75, 73/116.04
See application file for complete search history.

(56) References Cited

U.S. PATENT DOCUMENTS

| | | | |
|---|---|---|---|
| 1,102,510 A | 7/1914 | Irish | |
| 2,624,172 A * | 1/1953 | Houdry | 60/774 |
| 3,030,773 A | 4/1962 | Johnson | 60/39.65 |
| 3,131,749 A | 5/1964 | Davis | 158/4 |
| 3,146,821 A | 9/1964 | Wuetig | 158/1 |
| 3,176,751 A | 4/1965 | Gerlitz | 158/76 |
| 3,246,635 A * | 4/1966 | Powell et al. | 122/479.1 |
| 3,283,502 A | 11/1966 | Lefebvre | 60/39.74 |
| 3,430,443 A | 3/1969 | Richardson et al. | 60/39.65 |
| 3,589,127 A | 6/1971 | Kenworthy et al. | 60/39.65 |

(Continued)

FOREIGN PATENT DOCUMENTS

WO    WO 2004007922 A1 * 1/2004

OTHER PUBLICATIONS

Bykowski, Bruce B., et al.; "Advanced Procedures and Analytical Tools for Meeting SULEV Standards"; Eighth Coordinating Research Council (CRC) On-Road Vehicle Emissions Workshop, vol. 2; San Diego, California; Apr. 1998.

(Continued)

*Primary Examiner*—Kenneth B Rinehart
*Assistant Examiner*—Jorge Pereiro
(74) *Attorney, Agent, or Firm*—Baker Botts LLP

(57) ABSTRACT

A burner-based exhaust gas generation system, for producing exhaust gas, typically for use in testing exhaust system devices. Post-burner exhaust gas is recirculated back to a main exhaust line, and used for purposes such as cooling or enhancing the burner output.

8 Claims, 4 Drawing Sheets

U.S. PATENT DOCUMENTS

| | | | | |
|---|---|---|---|---|
| 3,630,024 | A | 12/1971 | Hopkins | 60/39.69 |
| 3,667,914 | A * | 6/1972 | Penquite | 436/37 |
| 3,694,135 | A | 9/1972 | Dancy et al. | 431/265 |
| 3,723,070 | A * | 3/1973 | Houdry | 422/105 |
| 3,758,258 | A | 9/1973 | Kölhi | 431/9 |
| 3,859,786 | A | 1/1975 | Azelborn et al. | 60/39.65 |
| 3,890,088 | A | 6/1975 | Ferri | 431/351 |
| 3,905,751 | A | 9/1975 | Hemsath et al. | 431/183 |
| 3,906,718 | A | 9/1975 | Wood | 60/39.65 |
| 3,916,619 | A | 11/1975 | Masai et al. | 60/39.65 |
| 3,958,413 | A | 5/1976 | Cornelius et al. | 60/39.06 |
| 3,962,866 | A * | 6/1976 | Neidhard et al. | 60/276 |
| 4,007,589 | A * | 2/1977 | Neidhard et al. | 60/276 |
| 4,035,137 | A | 7/1977 | Arand | 431/285 |
| 4,054,028 | A | 10/1977 | Kawaguchi | 60/39.23 |
| 4,054,418 | A | 10/1977 | Miller et al. | 23/277 |
| 4,118,171 | A | 10/1978 | Flanagan et al. | 431/10 |
| 4,224,912 | A * | 9/1980 | Tanaka | 123/568.19 |
| 4,270,896 | A | 6/1981 | Polinski et al. | 431/328 |
| 4,345,431 | A | 8/1982 | Suzuki et al. | 60/286 |
| 4,348,168 | A | 9/1982 | Coulon | 431/9 |
| 4,383,411 | A | 5/1983 | Riddel | 60/303 |
| 4,411,204 | A * | 10/1983 | Hamilton | 110/347 |
| 4,566,271 | A * | 1/1986 | French et al. | 60/286 |
| 4,651,524 | A | 3/1987 | Brighton | 60/274 |
| 4,845,940 | A | 7/1989 | Beer | 60/732 |
| 4,884,555 | A | 12/1989 | Huang | 126/350 |
| 4,995,807 | A * | 2/1991 | Rampley et al. | 431/9 |
| 5,002,483 | A | 3/1991 | Becker | 431/352 |
| 5,082,478 | A | 1/1992 | Oono et al. | 55/466 |
| 5,085,577 | A | 2/1992 | Muller | 431/265 |
| 5,140,814 | A | 8/1992 | Kreutmair et al. | 60/303 |
| 5,149,261 | A | 9/1992 | Suwa et al. | 431/207 |
| 5,177,464 | A * | 1/1993 | Hamburg | 340/439 |
| 5,265,417 | A * | 11/1993 | Visser et al. | 60/274 |
| 5,267,851 | A | 12/1993 | Washam et al. | 431/9 |
| 5,320,523 | A | 6/1994 | Stark | 431/353 |
| 5,339,630 | A | 8/1994 | Pettit | 60/303 |
| 5,396,794 | A | 3/1995 | Nichols | 73/118.1 |
| 5,408,215 | A * | 4/1995 | Hamburg | 340/439 |
| 5,584,178 | A | 12/1996 | Naegeli et al. | 60/303 |
| 5,590,521 | A | 1/1997 | Schnaibel et al. | 60/274 |
| 5,618,499 | A * | 4/1997 | Lewis et al. | 422/177 |
| 5,693,874 | A * | 12/1997 | De La Cruz et al. | 73/61.62 |
| 5,785,030 | A * | 7/1998 | Paas | 60/278 |
| 5,795,992 | A * | 8/1998 | Tanahashi et al. | 73/23.31 |
| 5,826,428 | A | 10/1998 | Blaschke | 60/303 |
| 5,860,277 | A | 1/1999 | Schnaibel et al. | 60/274 |
| 5,974,870 | A * | 11/1999 | Treinies et al. | 73/114.33 |
| 6,039,560 | A * | 3/2000 | Kubota | 431/9 |
| 6,205,768 | B1 * | 3/2001 | Dibble et al. | 60/39.511 |
| 6,216,458 | B1 * | 4/2001 | Alger et al. | 60/605.2 |
| 6,301,875 | B1 | 10/2001 | Backlund et al. | 60/39.5 |
| 6,327,889 | B1 | 12/2001 | Seltzer et al. | 73/1.02 |
| 6,378,359 | B1 | 4/2002 | Dobson et al. | 73/118.1 |
| 6,422,005 | B2 * | 7/2002 | Dolling et al. | 60/286 |
| 6,474,060 | B2 * | 11/2002 | Khair | 60/275 |
| 6,490,858 | B2 | 12/2002 | Barrett et al. | 60/280 |
| 6,532,793 | B1 | 3/2003 | Palocz-Andresen | 73/23.31 |
| 6,543,427 | B2 * | 4/2003 | Kawasaki | 123/568.12 |
| 6,568,255 | B2 | 5/2003 | Pallozzi | 73/116 |
| 6,586,254 | B1 | 7/2003 | Kumar et al. | 436/7 |
| 6,598,388 | B2 * | 7/2003 | Lucas et al. | 60/311 |
| 6,739,184 | B2 * | 5/2004 | Brazeau et al. | 73/116.02 |
| 6,756,904 | B2 * | 6/2004 | Kinugawa et al. | 340/606 |
| 6,761,077 | B1 | 7/2004 | Zhu | 73/865.6 |
| 6,776,609 | B1 * | 8/2004 | Sullivan et al. | 431/9 |
| 6,782,907 | B2 * | 8/2004 | Kawasaki et al. | 137/12 |
| 6,823,726 | B1 | 11/2004 | Nagy | 73/117.3 |
| 6,862,878 | B2 * | 3/2005 | Ries-Mueller | 60/277 |
| 6,877,366 | B2 * | 4/2005 | Rabl | 73/114.75 |
| 6,962,681 | B2 * | 11/2005 | Maganas et al. | 423/245.3 |
| 7,104,784 | B1 * | 9/2006 | Hasegawa et al. | 431/4 |
| 7,131,320 | B2 * | 11/2006 | Weinowski et al. | 73/114.75 |
| 7,140,874 | B2 | 11/2006 | Ingalls, Jr. et al. | 431/185 |
| 7,302,335 | B1 * | 11/2007 | Xiao | 701/103 |
| 2001/0023585 | A1 * | 9/2001 | Dolling et al. | 60/286 |
| 2001/0054281 | A1 | 12/2001 | Adams et al. | 60/276 |
| 2002/0170344 | A1 | 11/2002 | Pallozzi | 73/116 |
| 2003/0010024 | A1 * | 1/2003 | Maganas et al. | 60/300 |
| 2003/0012700 | A1 | 1/2003 | Carnahan | 422/102 |
| 2003/0079520 | A1 * | 5/2003 | Ingalls et al. | 73/23.31 |
| 2003/0084712 | A1 | 5/2003 | Smith et al. | 73/118.1 |
| 2004/0025580 | A1 * | 2/2004 | Webb et al. | 73/118.1 |
| 2004/0028588 | A1 * | 2/2004 | Webb et al. | 423/213.2 |
| 2004/0045489 | A1 * | 3/2004 | Rettig et al. | 110/342 |
| 2004/0076566 | A1 * | 4/2004 | Unger et al. | 423/235 |
| 2004/0187853 | A1 * | 9/2004 | Ries-Mueller | 123/568.16 |
| 2004/0237636 | A1 | 12/2004 | Bartley et al. | 73/118.1 |
| 2005/0022499 | A1 * | 2/2005 | Belokon et al. | 60/39.511 |
| 2005/0204804 | A1 * | 9/2005 | Weinowski et al. | 73/118.1 |
| 2008/0229730 | A1 * | 9/2008 | Ishibashi | 60/277 |

OTHER PUBLICATIONS

M.N. Ingalls, et al.; "Focas—A New Apparatus for Evaluating the Effects of Poisoning on Catalyst Durability," Eighth CRC On-Road Vehicle Emissions Workshop, vol. 2; San Diego, California; Apr. 1998.

SAE International, "Automotive Systems Testing Toptec", Oct. 14-15, 1998, Novi, Michigan (SAE Presentation), 1998.

Southwest Research Institute, "Fuel/Oil Catalyst Aging System (FOCAS)", 1999.

Preliminary Report on Patentability, PCT/US05/28468, 7 pages, Mailed on Jun. 21, 2006.

McCullough et al., An Experimental Evaluation of the Oil Fouling Effects of Two-Stroke Oxidation Catalysts, Society of Automotive Engineers, Inc., pp. 29-40, 1998.

Weisweiler et al., Simulation of a Driving Cycle in Laboratory: An Approach for Testing Catalysts Suitable for Automotive Exhaust $NO_x$ Abatement Under Lean Conditions, Chemical Engineering and Processing 37, pp. 229-232, 1998.

International Search Report and Written Opinion for International Application No. PCT/US06/09535 (9 pages), Apr. 5, 2007.

International Preliminary Report on Patentability with Written Opinion, PCT/US2006/009535, 5 pages, Apr. 5, 2007.

* cited by examiner

USE OF RECIRCULATED EXHAUST GAS IN A BURNER-BASED EXHAUST GENERATION SYSTEM FOR REDUCED FUEL CONSUMPTION AND FOR COOLING

CROSS-REFERENCE TO RELATED APPLICATIONS

This application claims the benefit of U.S. Provisional Application No. 60/662,581 filed on Mar. 17, 2005, entitled "Use of Recirculated Exhaust Gas in a Burner-Based Exhaust Generation System for Reduced Fuel Consumption and for Cooling", which is incorporated herein by reference in its entirety.

TECHNICAL FIELD OF THE INVENTION

This invention relates generally to systems and methods for simulating exhaust gas produced by an internal combustion engine, and more particularly to recycling exhaust gas in a burner-based exhaust gas simulation system for purposes such as reducing fuel consumption and cooling.

BACKGROUND OF THE INVENTION

As a result of recent regulatory initiatives, motor vehicle emissions aftertreatment devices are required to have longer useful lives. For example, in the 1990's, the United States Environmental Protection Agency (EPA) increased the mileage for which automotive emission control elements must function from 50,000 to 100,000 vehicle miles. This requirement places severe demands on emissions control devices as they age. As one example of the deleterious effects of aging, various exhaust gas components can "poison" a catalytic type emissions treatment device over time.

To understand the effects of aging of emissions control devices, it is necessary to have a test system and procedure that will permit the evaluation of the long term effects of individual variables that may affect the performance of the device.

Historically, "engine-based" test systems, which receive emissions from actual internal combustion engines have been used for such evaluations. However, engine-based systems can be inconsistent, maintenance intensive, and expensive to operate. In addition, engine-based systems do not conveniently permit the separate evaluation of individual variables, such as the effects of fuel and oil constituents. Also, in engine-based systems, engine oil consumption varies with engine age, operating temperature, speed and other variables, which are all difficult to control.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various embodiments of a burner-based exhaust gas generation system, in which exhaust gas is diverted from the main exhaust path and recirculated back to a more upstream point in the path. In the embodiments of this description, the system is used for aging emissions control devices (ECD's). A portion of the exhaust gas is diverted from the main exhaust path downstream the burner, a heat exchanger, and test ECD's. It is re-circulated such that it re-enters the main exhaust path after the burner.

Overview of Burner-Based Exhaust Gas Generation System

Figure 1:
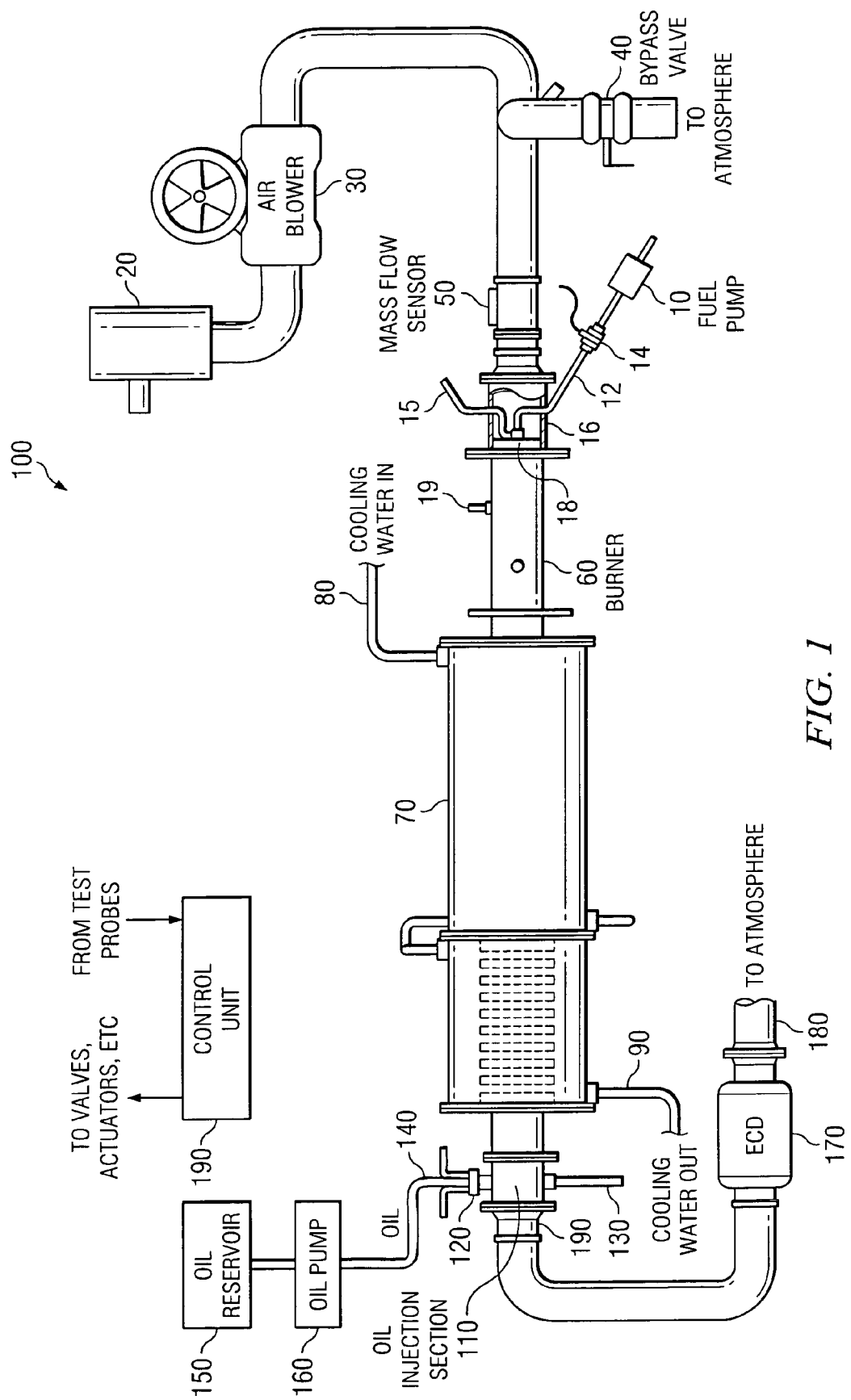
FIG. 1 illustrates an example of a burner-based exhaust generation system with which the invention may be used.

FIG. 1 illustrates a burner-based exhaust gas generation system 100. System 100 is an example of a system with which the invention (described in connection with FIGS. 2-4) may be used.

System 100 may be used to simulate the production of exhaust gas by an internal combustion engine. For example, it may be used to simulate the production of exhaust gas by a motor vehicle.

A typical use of system 100 is for aging an emissions control device (ECD) 170, such as those installed in the exhaust system of an engine. System 100 may be used accurately produces the effects of heat, additives, contaminants, and other effects of use on the efficiency of the emissions control device.

System 100 is especially suitable for aging an emissions control device (ECD) over simulated extended driving conditions. System 100 accurately produces the effects of additives and contaminants from the engine fuel and/or lubricant oil on the durability of the emissions control device. The aged device can then be performance tested on an actual vehicle, or otherwise evaluated.

System 100 provides exhaust from combustion of any one of various types of fuels for internal combustion engines. Examples of such fuels are gasoline, synthetic gasoline, diesel, liquefied fuel produced from coal, peat or similar materials, methanol, compressed natural gas, or liquefied petroleum gas. The exhaust is provided with a specified air-to-fuel ratio. A separate oil atomization system permits isolation of the effects of fuel and of lubricant at various consumption rates and states of oxidation.

System 100 is capable of operating over a variety of conditions. It may simulate various modes of engine operation, such as cold start, steady state stoichiometric, lean, rich, and cyclic perturbation.

Further details of a test system, like that of system 100 and with which the invention may be used, are described in U.S. patent Ser. No. 10/213,890, entitled "Method and Apparatus for Testing Catalytic Converter Durability", to Ingalls, et al., assigned to Southwest Research Institute, and incorporated by reference herein.

The main subsystems of system 100 are: (1) an air supply system to provide air for combustion to the burner, (2) a fuel system to provide fuel to the burner, (3) a burner system to combust the air and fuel mixture and provide the proper exhaust gas constituents, (4) a heat exchanger to control the exhaust gas temperature, (5) an oil injection system, and (6) a computerized control system.

In the example of FIG. 1, these subsystems are configured in series along a flow line. At the point of installation of the ECD, the flow line simulates an exhaust tail pipe. Although not shown in FIG. 1, secondary air may be injected into the flow line, for example, at a point between the heat exchanger and the ECD.

The air supply system has an air blower 30, which draws ambient air through an inlet air filter 20 and exhausts a pressurized stream of air. The volume of air supplied is set by adjusting a bypass valve 40 to produce a desired flow rate of air, which is measured by a mass flow (MAF) sensor 50.

Air blower 30 and MAF sensor 50 may be of any design, including conventional designs known to persons of ordinary skill in the art. An example of a suitable blower 30 is an electric centrifugal blower, such as a Fuji Electric Model VFC404A Ring Blower. An example of a suitable MAF sensor 50 is an automotive inlet air flow sensor such as a Bosh Model Number 0280214001 available from most retail automotive parts stores.

The fuel supply system has a fuel pump 10, which pumps automotive fuel via fuel line 12 through a fuel control valve 14, and eventually to burner 60. Although various types of control valves may be used, an example of a suitable fuel control valve 14 is a solenoid valve. Valve 14 receives a signal from control unit 190 and regulates the flow of fuel to burner 60.

Valve 14 may be of a design which will operate with a pulse modulated signal. An example of a suitable control valve 14 is a Bosch frequency valve model number 0280 150 306-850 available from most retail automotive parts suppliers. From valve 14, the fuel is piped to a fuel injector 16 associated with burner 60. An air assist line 15 may be used to provide high pressure air for atomization of the fuel.

Burner 60 combusts fuel in the presence of air. An example of a suitable burner 60 is a swirl-stabilized burner capable of producing continuous stoichiometric combustion of automotive fuel.

Burner 60 comprises a plenum chamber and a combustion tube. A swirl plate 18 separates the plenum chamber from the combustion tube. The air and fuel are separately introduced into the burner 60. Air is delivered to the plenum chamber, then through the swirl plate 18 into the burner tube.

Swirl plate 18 is equipped with a fuel injector 16. The mixture of gas and air are combusted with the aid of at least one spark igniter 19, which may be placed through the wall of the combustion tube of burner 60. An example of a suitable spark igniter 19 is a spark plug.

Heat exchanger 70 receives the exhaust from burner 60. Heat exchanger 70 may be of any conventional design known persons of ordinary skill in the art. In the example of FIG. 1, heat exchanger 70 is a gas-to-liquid heat exchanger, but air-to-air devices could also be used.

In the example of FIG. 1, heat exchanger 70 has two sections. An upstream section consists of a water jacketed tube. A downstream section is a vertical cross flow shell and tube heat exchanger. The vertical cross flow design minimizes steam formation and steam trapping within the cooling tubes. The heat exchanger 70 is provided with an inlet water line 80 and an outlet water line 90, which supply and drain cooling water to cool the exhaust gas to a temperature. For ECD testing, this temperature simulates the temperature present at the inlet to the ECD in a specified motor vehicle.

The oil injection section 110 is downstream the exhaust line from burner 60. In the example of FIG. 1, it is also downstream heat exchanger 70. Oil injection section 110 provides an optional atomized oil spray comprising oil droplets with a sufficiently small diameter to vaporize and oxidize the oil before it reaches the catalyst. In operation, a sample of oil is withdrawn from an oil reservoir 150 by means of an oil pump 160. Various types of pumps may be used, such as a peristaltic type pump. Pump 160 delivers oil from the reservoir through an oil injection line 140 and into a water cooled probe 120 from which the oil is injected into the exhaust gas in the oil injection section 110.

Control unit 190 provides a means to control operating parameters of system 100, such as ignition, air assist to the fuel injector, auxiliary air, fuel feed, blower air feed, and oil injection. An example of a suitable control unit 190 is a processor-based system having hardware and software appropriate for the data acquisition, processing, and control signal generation described herein. The level of sophistication of control unit 190 may vary from simple embedded controller type devices to computers with sophisticated user interface programming.

Control unit 190 is in communication with various test probes (not shown), which collect data regarding a number of parameters associated with system 100. Example parameters are: the mass air flow in the system, the air/fuel ratio (linear and EGO), the exhaust gas temperature at the outlet from the heat exchanger, the exhaust gas temperature at the inlet to the ECD, and the exhaust gas temperature at the outlet from the ECD. The information measured by the test probes is transmitted by electronic signals to control unit 190.

Control unit 190 is capable of controlling a number of parameters associated with system 100, using various valves and actuators. Examples of control output parameters are power to the blowers and fuel pump, activation of fuel injectors, burner spark, oil injection, and auxiliary air.

In operation, control unit 190 receives signals representing system temperatures, mass air flow for the burner air, and the burner air to fuel ratio. These measurements are converted to data, and the measured data is the basis for calculating operating conditions such as total exhaust flow and burner air to fuel ratio. Output parameters are determined by the engine being simulated.

The burner air to fuel ratio may be controlled as either open or closed loop, maintaining either specified fuel flow or specified air to fuel ratio. Air to fuel ratio control may be achieved by varying the rate of fuel delivered to the burner.

It should be understood that the system of FIG. 1 is but one example of an exhaust gas simulation system with which the invention may be used. In general, the invention is useful with any burner-based exhaust gas simulation system.

System 100 may or may not be used for testing emissions control devices—in practice it may be used to test any device affected by an engine exhaust system or it may simply be used to produce exhaust gas. In systems, such as the example of FIG. 1, in which system 100 is used for testing one or more emissions control devices, system 100 is equipped with at least one "insertion point" so that these devices may be conveniently installed and removed at will.

Recirculated Exhaust Gas

As described above, burner-based exhaust gas generation provides hot combustion exhaust gas (gases and particulate matter) without the need to run an internal combustion engine. When motor vehicle operation is being simulated, it is often desired to provide exhaust gas from stoichiometric combustion. However, stoichiometric combustion may provide exhaust products at a temperature too high for realistic testing. For this reason, burner-based systems such as the system of FIG. 1, use a heat exchanger or other method of cooling the exhaust gas. Also, for stoichiometric combustion, a desired mass flow of exhaust gas may require high fuel consumption.

Figure 2:
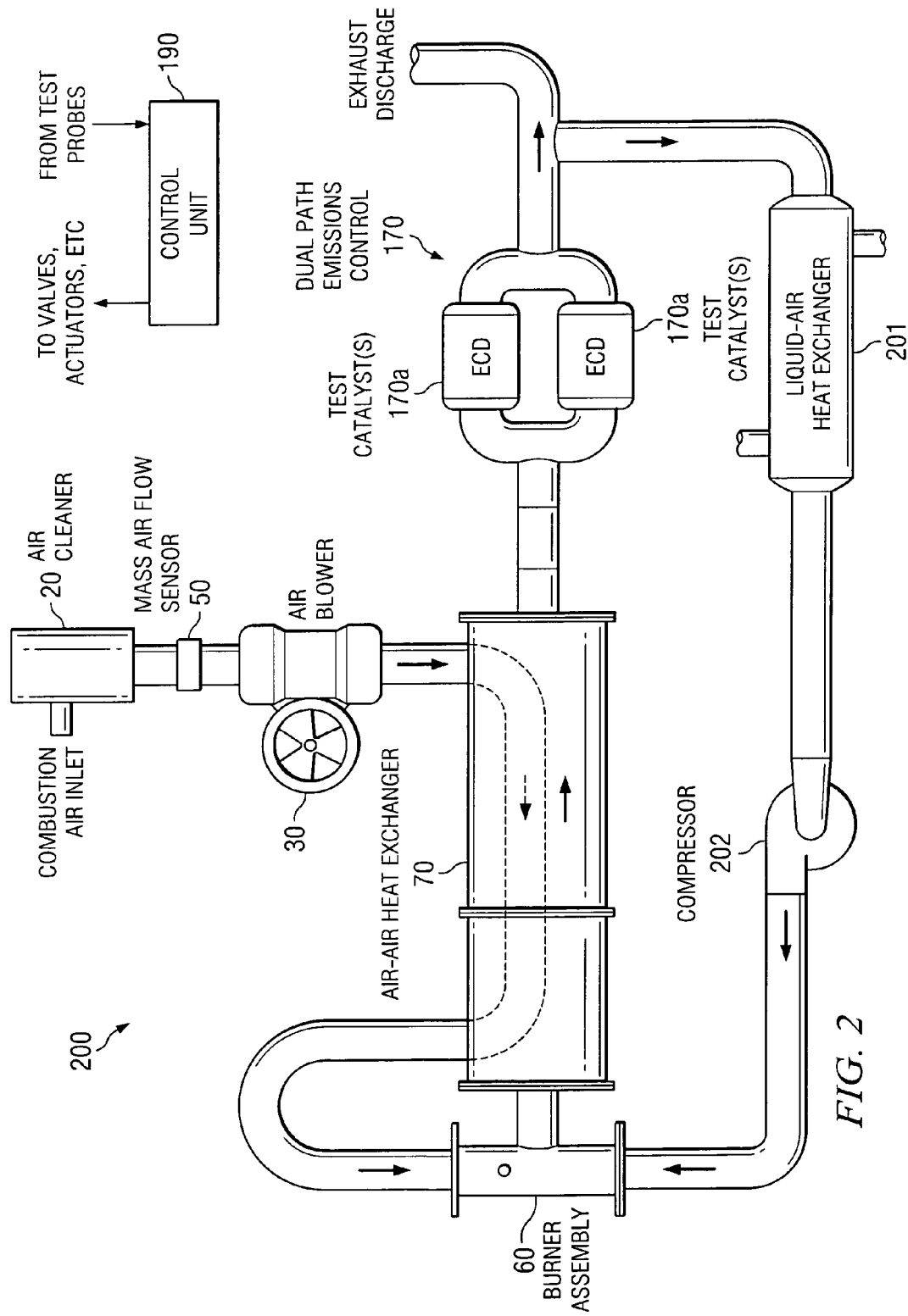
FIG. 2 illustrates one embodiment of how the system of FIG. 1 may be modified to implement exhaust gas recirculation.

FIG. 2 is a modified embodiment of FIG. 1, with system 200 having an exhaust gas recirculation path. FIG. 2 illustrates how both fuel consumption and heat exchanger demand can be reduced by recirculating exhaust gas. The cooler recirculated exhaust gas is mixed with fresh, hot exhaust gas upstream the heat exchanger 70. By "upstream" is meant that the mixture occurs either in front of, or at the input to, the heat exchanger 70, such that the mixture is cooled by the heat exchanger 70.

In the example of FIG. 2, the exhaust gas is diverted from the main flow line downstream of the emissions control devices 170*a* being tested. Thus, prior to being recirculated, exhaust gas exits the burner 60, flows through heat exchanger 70 and the emissions control devices 170*a*. In other embodiments, the diversion of exhaust gas may occur at other points, but in general, the diversion occurs at some point downstream of the burner 60.

In the example of FIG. 2, the emissions control subsystem 170 is a dual-path system comprising two paths, which divide the main exhaust path downstream the heat exchanger 70. Each path has an emissions control device 170*a*. An example of a dual-path system 170 is one in which the emissions control devices 170*a* are NOx adsorption devices, which alternately adsorb and regenerate. In other embodiments, there may be a single emissions control device as in FIG. 1, or a series of emissions control devices, such as an emissions control system having both a catalyst and particulate filter.

In the example of FIG. 2, the recirculation path includes a recirculation heat exchanger 201 for cooling the recirculated exhaust gas. In the example of FIG. 2, heat exchanger 201 is a liquid-air type device, receiving and discharging water as the cooling agent. Heat exchanger 201 cools the recycled combustion exhaust products prior to its being reintroduced and mixed with hot exhaust gas fresh from burner 60.

Compressor 202 is used to pull the cooled recirculated exhaust is pulled through the recirculation path. Compressor 202 may be any one of various types of mechanical gas pumps, operable to force recirculation of the recycled combustion exhaust gas. This gas pump could be of the form of a positive displacement, centrifugal, or axial compressor. A variable speed pump could be used to control the amount of combustion exhaust products recycled and mixed with fresh, hot combustion products.

As stated above, at some point after burner 60, the burner output is mixed with the recirculated exhaust. The recirculated exhaust and the burner exhaust become the total exhaust gas flow through the rest of the exhaust path.

In the example of FIG. 2, an air-to-air heat exchanger 70 is used for further cooling. Specifically, cooled input air from blower 30 is flowed through the exchanger and used to cool the mixture of burner exhaust gas and recirculated exhaust gas.

In other embodiments, the heat exchanger 70 could be a liquid-air heat exchanger as in FIG. 1, cooling the mixed exhaust. Or, in some embodiments, it is possible that the heat exchanger 70 could be omitted, with the cooler recirculated exhaust providing sufficient cooling for the particular application of system 200. In any event, the mixture of recirculated exhaust gas with exhaust gas direct from burner 60 results in cooled exhaust gas that is directed down the remainder of the main exhaust path.

The use of recirculated exhaust results in less fuel and air required to be supplied to burner 60 for a given flow rate through the main exhaust path. Ultimately, a significant savings in fuel consumption is expected. Combustion exhaust gas from a burner-based test system may be used to reduce fuel consumption while maintaining stoichiometric combustion.

Where system 200 is used for reduced fuel consumption in this manner, the use of heat exchanger 70 may be optional. It is also possible that the recirculated exhaust gas and input air could be mixed prior to combustion. That is, the recirculated exhaust could be delivered back to the main flow line upstream burner 60.

System 200 further permits control of combustion exhaust gas to provide a desired exhaust gas temperature in the main exhaust path. Where emissions control devices are being tested, the recirculated gas can be used to control the temperature at the inlet to the devices 170*a*. Also, the combustion exhaust gas may be used to reduce the heat rejection capacity of the heat exchanger 70.

Control unit 190 may be programmed to receive measured temperature data. The amount of recirculated exhaust and/or the operation of the heat exchanger 70 can be controlled, using control signals such as signals to one or more valves (illustrated in FIG. 3) or to the heat exchanger 70, to provide a desired temperature.

Figure 3:
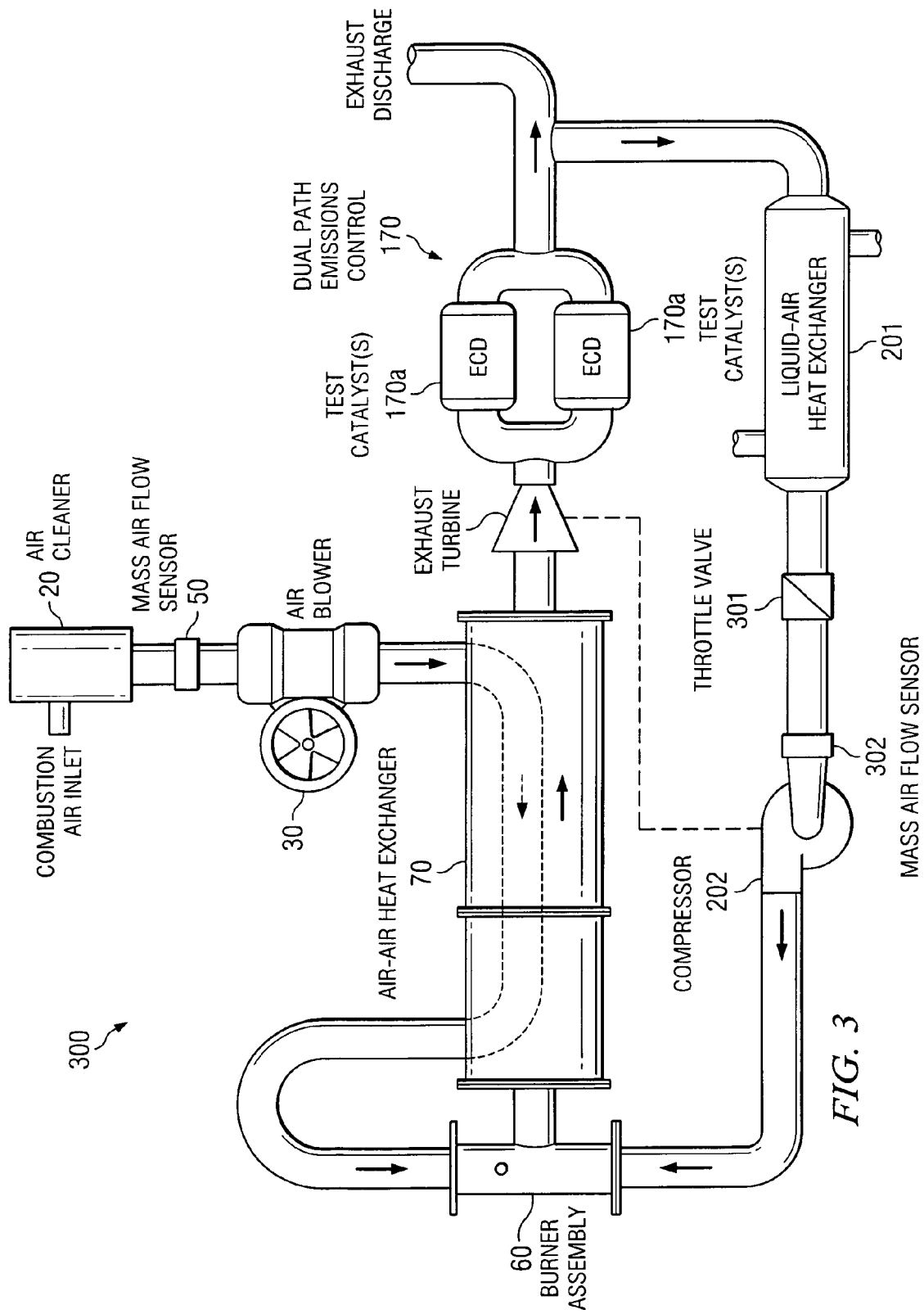
FIG. 3 illustrates the system of FIG. 2, with the addition of a throttle valve on the recirculation path.

FIG. 3 illustrates system 300, similar to system 200, but with the addition of a throttle valve 301 in the recirculation path. Valve 301 provides control of cooled combustion exhaust products. It permits a desired temperature of the exhaust gas at the emissions control devices 170*a*.

FIG. 3 further illustrates the use of a mass air flow sensor 302 or other method of measuring the mass flow of the recycled combustion exhaust products. This measurement may then be used by control unit 190, which controls one or more electromechanical controls to maintain a desired temperature of the recycled exhaust gas. These measurements and controls may also be used to calculate and minimize fuel consumption.

Use of Air-Charging Device for Cooling

Referring again to FIG. 1, in existing burner-based exhaust gas generation systems, such as system 100, the high temperature exhaust gases that exit the emissions control device are often sent up a chimney stack to the atmosphere. The burner 60 generates enormous amounts of heat energy at significant flows that is wasted.

Figure 4:
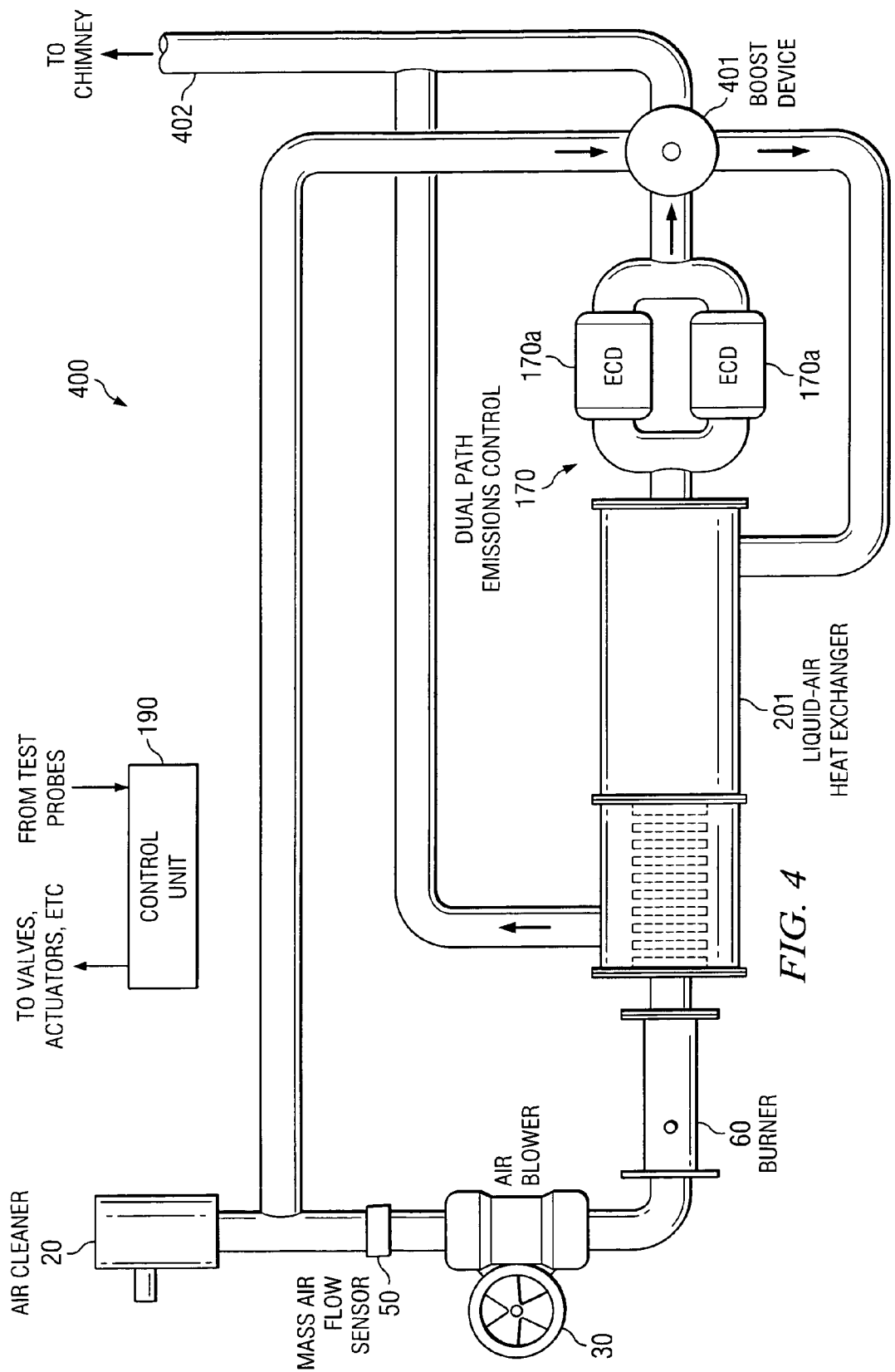
FIG. 4 illustrates another embodiment of how the system of FIG. 1 may be modified to implement exhaust gas recirculation, using an air-charging device driven by hot exhaust gas.

FIG. 4 illustrates how such systems may be modified for improved cooling of the system 100. In system 400, the energy generated by burner 60 is used to drive an air-charging device 401, which provides boosted cooling of the heat exchanger 70. In the example of FIG. 4, the emissions control subsystem 170 is a dual-path system like that of FIGS. 2 and 3.

As illustrated, air-charging device 401 is placed in-line the exhaust path downstream the emissions control subsystem 170. In the example of FIG. 4, the air-charging device 401 is a turbocharger. Other air-charging devices, also known as "boost air devices", could be used.

A filter 20 is placed upstream the mass air flow (MAF) sensor 50. The compressor side of the air-charging device 401 draws filtered air before the mass air flow (MAF) sensor.

The air-charging device 170 is driven by the high temperature side of the exhaust path. In the example of FIG. 4, the air-charging device directly receives exhaust gas from the emissions control subsystem 170. Where the air-charging device 401 is a turbocharger, the high temperature exhaust gas drives the turbine.

The boosted air is directed to the heat exchanger 70, and used for cooling the heat exchanger. Heat exchanger 70 is an "air-to-air" type device, using air for cooling rather than liquid.

Warmed air exiting the heat exchanger 70 would be directed to the chimney 402 downstream (relative to the main exhaust path) the air charging device 401.

One advantage of system 400 is that, as compared to liquid cooling, air cooling has a lower heat gradient and results in less thermal shock at heat exchanger 70. This minimizes thermal stress fractures at the heat exchanger welds. Also, an air-to-air heat exchanger device 70 reduces soot build up on the internal flow tube and heat exchanger.

In other embodiments, the air charging device 170 could be used to drive recirculated exhaust gas (or air) to some other point on the flow line. The recirculated exhaust or charged air could be used to cool or air-charge other devices associated with system 400. For example, air charging device 170 could be used to drive recirculated exhaust gas back behind burner 60. In this case, heat exchanger 70 would use other air or liquid for cooling rather than the air from the air charging device 170.

System 400 also gives rise to a further application of exhaust gas simulation systems. Specifically, system 400 can serve as a platform for testing the air-charging devices themselves and their components.

What is claimed is:

1. A burner-based system for generating exhaust gas that simulates exhaust gas from an internal combustion engine, and for delivering the exhaust gas to an emissions control device for testing, comprising:
   a main flow line;
   a forced air device for forcing air along the main flow line;
   a burner downstream the forced air device;
   a fuel injector for delivering fuel to the burner;
   wherein the burner combusts a mixture of air and fuel in a combustion region, thereby providing fresh exhaust gas as output from the combustion region;
   a recirculation flow line for diverting at least a portion of the exhaust gas from the main flow line at a point downstream the emissions control device and for delivering the diverted exhaust gas back to the main flow line at a point downstream the burner's combustion region;
   a main flow heat exchanger that receives the fresh exhaust directly from the burner, and also receives the diverted exhaust gas, and delivers a cooled mixture of exhaust gas directly to the emissions control device; and
   a compressor on the recirculation flow line configured to receive only recirculated exhaust and to boost the flow of the recirculated exhaust through the recirculation flow line and into the main flow line;
   a turbine on the main flow line, the turbine configured to drive the compressor, and the turbine directly receiving the output of the main flow heat exchanger and directly exhausting into the emissions control device;
   a mass air flow sensor on the recirculation line; and
   a control unit for receiving a measurement signal from the mass air flow sensor and for controlling the fuel delivered to the burner at least partly in response to the measurement signal.

2. The system of claim 1, wherein the heat exchanger is an air-to-air heat exchanger and receives air from the forced air device.

3. The system of claim 1, wherein the heat exchanger is an air-to-air heat exchanger and wherein the main flow line from the forced air device is routed through the heat exchanger before being routed to the burner.

4. The system of claim 1 further comprising a recirculation exhaust gas heat exchanger on the recirculation flow line.

5. The system of claim 1, further comprising a throttle on the recirculation path for controlling the amount of recirculated exhaust gas delivered to the main flow line.

6. A method of using recirculated exhaust gas to contribute to the mass air flow of a burner-based exhaust gas simulation system, and for delivering the a mixture of fresh and recirculated exhaust to an emissions control device for testing, comprising:
   using a forced air device to force air along a main flow line;
   using a burner downstream the forced air device to combust a mixed of air and fuel, thereby providing exhaust gas;
   using a heat exchanger to receive fresh exhaust directly from the burner;
   installing the emissions control device directly downstream the heat exchanger;
   diverting at least a portion of the exhaust gas from the main flow line at a point downstream the emissions control device, and delivering the diverted exhaust gas back to the main flow line at a point between the burner and the heat exchanger;
   such that the heat exchanger delivers a cooled mixture of fresh exhaust and recirculated exhaust directly to the emissions control device; and
   using a mass air flow sensor to measure the amount of recirculated exhaust gas; and
   controlling the fuel input to the burner at least partly in response to the amount of recirculated exhaust gas;
   using a compressor on the recirculation flow line to receive only the recirculated exhaust and to boost the flow of the recirculated exhaust into to the main flow line;
   wherein the compressor is driven by a turbine on the main flow line, the turbine directly receiving the output of the main flow heat exchanger and directly exhausting into the emissions control device.

7. The method of claim 6, wherein the heat exchanger is an air-to-air heat exchanger, and further comprising using air from the forced air device to provide cool air for the heat exchanger.

8. The method of claim 6, further comprising using a throttle on the recirculation path to receive the control signals and to control the amount of recirculated exhaust gas delivered to the main flow line.

* * * * *